United States Patent
Siekierka et al.

(10) Patent No.: US 6,222,129 B1
(45) Date of Patent: *Apr. 24, 2001

(54) TWISTED PAIR CABLE

(75) Inventors: Thomas J. Siekierka; Robert David Kenny, both of Richmond, IN (US)

(73) Assignee: Belden Wire & Cable Company, Richmond, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/049,635

(22) Filed: Mar. 27, 1998

Related U.S. Application Data

(63) Continuation-in-part of application No. 08/676,430, filed on Jul. 8, 1996, now Pat. No. 5,734,126, which is a continuation-in-part of application No. 08/032,149, filed on Mar. 17, 1993, now Pat. No. 5,606,151, and a continuation-in-part of application No. 08/642,489, filed on May 3, 1996, now Pat. No. 5,744,757, which is a continuation-in-part of application No. 08/412,052, filed on Mar. 28, 1995, now Pat. No. 5,514,837.

(51) Int. Cl.[7] .................................................. H01B 11/02
(52) U.S. Cl. ................................... 174/113 R; 174/110 F
(58) Field of Search ........................... 174/113 R, 110 F, 174/110 PM, 110 R, 120 R, 121 A

(56) References Cited

U.S. PATENT DOCUMENTS

| | | |
|---|---|---|
| 3,102,160 | 8/1963 | Cook et al. . |
| 3,219,752 * | 11/1965 | Harris ................. 174/117 F |
| 3,361,871 * | 1/1968 | Brandt ..................... 174/112 |
| 3,516,859 * | 6/1970 | Gerland et al. ............ 174/110 F |
| 3,715,458 | 2/1973 | Bayes et al. . |
| 3,761,842 | 9/1973 | Gandrud . |
| 3,921,381 | 11/1975 | Vogelsberg . |
| 4,010,231 | 3/1977 | Berglowe, Jr. et al. . |
| 4,356,345 | 10/1982 | Lee . |
| 4,449,012 | 5/1984 | Voser . |
| 4,467,138 | 8/1984 | Brorein . |
| 4,486,619 | 12/1984 | Trine et al. . |
| 4,873,393 | 10/1989 | Friesen et al. . |
| 4,933,513 | 6/1990 | Lee . |
| 5,010,210 | 4/1991 | Sidi et al. . |
| 5,015,800 | 5/1991 | Vaupotic et al. . |
| 5,103,067 | 4/1992 | Aldissi . |
| 5,142,100 | 8/1992 | Vaupotic . |
| 5,162,609 | 11/1992 | Adriaenssens et al. . |
| 5,245,134 | 9/1993 | Vana, Jr. . |
| 5,270,486 * | 12/1993 | Chan et al. ............... 174/120 RA X |
| 5,283,390 | 2/1994 | Hubis et al. . |
| 5,342,991 | 8/1994 | Xu et al. . |
| 5,448,669 | 9/1995 | Dunn et al. . |
| 5,606,151 * | 2/1997 | Siekierka et al. ............ 174/113 R |
| 5,670,748 * | 9/1997 | Gingue et al. ............ 174/120 R |
| 5,734,126 * | 3/1998 | Siekierka et al. ............ 174/113 R |

FOREIGN PATENT DOCUMENTS 1265877   5/1961   (FR) .

OTHER PUBLICATIONS

European Pat. Appln. 0302162A3; date Jan. 19, 1998.

\* cited by examiner

*Primary Examiner*—Kristine Kincaid
*Assistant Examiner*—Chau N. Nguyen
(74) *Attorney, Agent, or Firm*—Robert F. I. Conte; Lee, Mann, Smith, McWilliams, Sweeney & Ohlson

(57) ABSTRACT

A twisted pair cable which is exceptionally suitable for high frequency signal transmission. One embodiment provides a twisted pair cable having two conductors with a foamed dielectric surrounding each conductor, and having a center-to-center conductor spacing at any point along a 1000 ft. cable that varies ±0.03 times the average of the center-to-center conductor. Another embodiment provides a twisted pair cable having two conductors with a foamed dielectric surrounding each conductor, and having an impedance of 90 to 110 ohms with a tolerance of ±5% of an average impedance. The preferred twisted pair cable has their dielectrics joined along the entire length thereof.

20 Claims, 1 Drawing Sheet

TWISTED PAIR CABLE

This is a continuation-in-part of application Ser. No. 08/676,430 filed Jul. 8, 1996, now U.S. Pat. No. 5,734,126, which was a continuation-in-part of our application Ser. No. 08/032,149 filed Mar. 17, 1993, now U.S. Pat. No. 5,606,151, and a continuation-in-part of application 08/642,489 filed May 3, 1996, now U.S. Pat. 5,744,757 which was a continuation-in-part of application 08/412/052 filed Mar. 28, 1995, now U.S. Pat. 5,514,837.

FIELD OF THE INVENTION

The present invention relates to twisted pair cables which can be used in high frequency applications and more particularly, the present invention relates to high frequency twisted pair cables having a pair of insulated conductors wherein each insulated conductor has at least a foam insulating layer surrounding the conductor.

BACKGROUND OF THE INVENTION

In the past, twisted pair cables were utilized in applications where data speeds reached an upper limit of about 20 kilobits per second. Recent advances in wire technology and hardware equipment have pushed the upper limit of twisted pair cable applications to about several hundred megabits per second.

Twisted pair technology advances have primarily focused on near end crosstalk. Both U.S. Pat. No. 3,102,160 and U.S. Pat. No. 4,873,393 teach the importance of utilizing pairs which are twisted with lengths of lay different from integral multiples of the lengths of lay of other paired conductors within the cable. This is done to minimize electrical coupling between paired conductors.

U.S. Pat. No. 5,015,800 focuses on another important issue of maintaining a controlled impedance throughout the transmission line. It teaches how impedance can be stabilized by the elimination of air gaps around a twisted pair embodiment through the use of a dual dielectric which has outer layers bonded after the insulated conductors are twisted.

When two or more pairs of different average impedance are connected together to form a transmission line (often referred to as a channel), part of the signal will be reflected at the point of attachment(s). Reflections due to impedance mismatch ultimately causes problems with signal loss and tracking errors (jitter).

Prior attempts to control conductor spacing has been entirely for the purposes of stabilizing capacitance within a cable. It is well known in the industry that utilizing a cable with uniform capacitance between its pairs has the advantage of reducing crosstalk. U.S. Pat. No. 3,102,160 explains how equal and uniform capacitance can be achieved along a transmission line by simultaneously extruding dielectric over two conductors.

However, U.S. Pat. No. 3,102,160 did not recognize problems encountered with impedance mismatch at high frequencies. The impedance of the cable was of little importance provided the capacitance of each pair within the cable was relatively uniform. The problem is in that different cables can have uniform capacitances between their respective pairs and yet possess different average impedances.

Another problem with the U.S. Pat. No. 3,102,160 is with regard to insulated conductor separation. In order for the pairs of the said cable to be used with current LAN systems and connecting hardware, the adjoined insulated conductors must have the ability to be separated from one another for at least 1 inch along the length of the pair. The prior art provides no means for the separation of the two adjoined insulated conductors.

SUMMARY OF THE INVENTION

Accordingly, with the first dielectric layer being a foamed dielectric, it is an object of this invention to provide a twisted pair cable having two conductors, at least two dielectric layers surrounding each conductor, the conductors and corresponding dielectric layers being twisted substantially along the length of the cable to provide the twisted pair cable having a center-to-center distance between the two twisted conductors varying over any 1000 ft length ±0.03 times an average center-to-center distance with the average center-to-center distance being the average of at least 20 distance measurements taken at least 20 feet apart from three randomly selected 1000 ft twisted cable of the same size taken from the same run or from three successive runs.

It is a further object of this invention to provide a twisted pair cable having two conductors, a dielectric layer surrounding each conductor, the conductors and corresponding dielectric layers being twisted substantially along the length of the cable to provide the twisted pair cable having over any 1000 ft., an impedance of about 90 to 110 ohms when measured at frequencies of about 10 MHz to about 200 MHz, the impedance being within an impedance tolerance of ±5% of an average impedance, the average impedance being:

a. an average of at least one impedance measurement on each of at least twenty 1,000 ft. twisted pair cables of the same size taken from the same run, or b. an average of at least one impedance measurement from each of twenty randomly selected 1000 ft. twisted pair cables of the same size, taken from three separate successive runs with each run being at least 24 hours apart from each other, or c. selecting one twisted pair cable from twenty consecutive 1000 ft. twisted pair cable and taking at least 200 impedance measurements on the one twisted pair cable with the at least 200 impedance measurements being at between 10 MHz and 200 MHz taken in less than 0.5 MHz increments.

The present invention and advantages thereof will become more apparent upon consideration of the following detailed description when taken in conjunction with the accompanying drawings.

DETAILED DESCRIPTION OF THE INVENTION

Figure 1:
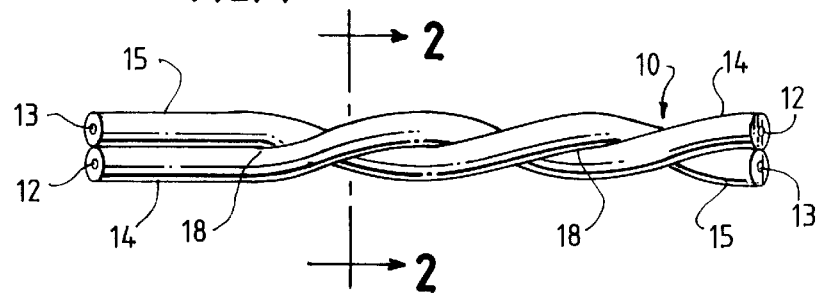
FIG. 1 is a side view of a twisted pair cable in accordance with a preferred embodiment of the invention.
Figure 2:
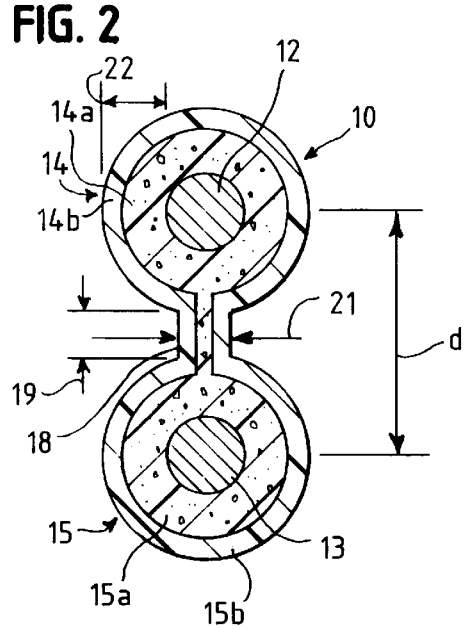
FIG. 2 is an enlarged cross section taken along lines 2—2 of FIG. 1.

FIGS. 1 and 2 show one embodiment of our twisted pair cable 10 that can be used in high frequency applications. The cable 10 has two solid, stranded or hollow conductor wires 12 and 13. The conductors are solid metal, a plurality of metal strands, an appropriate fiber glass conductor, a layered metal or combination thereof.

Each conductor 12 and 13 is surrounded by respective cylindrical dielectric or insulation 14 and 15. Each of the conductors 12 and 13 is disposed centrally within and thus substantially concentric with the corresponding insulations 14 and 15. The conductors 12 and 13 may, if desired, adhere to any degree against the inner walls of their respective insulation by any suitable means, such as by bonding, by heat or adhesives to prevent relative rotation between the conductors and insulations. As shown in FIG. 2, the insulation 14 has an inner or first layer of foam dielectric 14a surrounding the conductor 12 and an outer or second layer of dielectric 14b surrounding the first layer 14a. The insulation 15 has an inner or first layer of foam dielectric 15a surrounding the conductor 13 and an outer or second layer of dielectric 15b surrounding the first layer 15a.

The cable 10 has a common insulation for both conductors 12 and 13 as shown in FIG. 2 where the insulations 14a and 15a and the insulations 14b and 15b are integral with each other and are joined together along their lengths in any suitable manner. As shown, the joining means is an integral web 18 which extends from the diametric axis of each insulation. The width 19 of the web is in the range of from about 0.00025 to about 0.150 inches. The thickness 21 of the web is also in the range of from about 0.00025 to about 0.150 inches. The web thickness is preferably less than the thickness of 22 of both dielectric layers. The web width is preferably less than the thickness 22 of the dielectric layers.

The diameter (traditionally expressed in AWG size) of each of the conductors 12 and 13 are preferably between about 18 to about 40 AWG.

The conductors 12 and 13 are preferably metal conductors and may be constructed of any suitable metallic material such as solid or strands of copper, metal coated substrate, silver, aluminum, steel, alloys or a combination thereof. The dielectric may be suitable material used in the insulation of cables such as foamed and non-foamed polyvinylchloride, polyethylene, polypropylene or fluoro-copolymers (such as Teflon, which is a registered trademark of DuPont), fluoropolymers (such as HALAR which is a trademark of Ausimont), cross-linked polyethylene, rubber, etc. Many of the insulations may contain a flame retardant.

It is preferred that the first layer of foamed dielectric 14a and 15a are the same material as the second dielectric 14b and 15b which may be a partially foamed or non-foamed material.

The thickness 22 of the dielectric layers 14 and 15 is in the range of from about 0.00025 to about 0.150 inches.

The dual conductors surrounded by the joined dielectric (s) layers 14 and 15 are twisted to form a twisted pair cable. The variation in the distance between the centers of adjacent conductors, hereinafter referred to as the center-to-center distances, along the twisted pair cable is very small. The center-to-center distance d at any one point along the twisted pair cable does not vary by more than ±0.03 times the average of center-to-center distances measured along the twisted parallel cable with the average being calculated by randomly selecting three 1000 ft. twisted pair cables of the same size from the same run or three successive runs on three separate days, taking 20 measurements on each cable at least 20 ft. apart and calculating the average of all the measurements.

Figure 3:
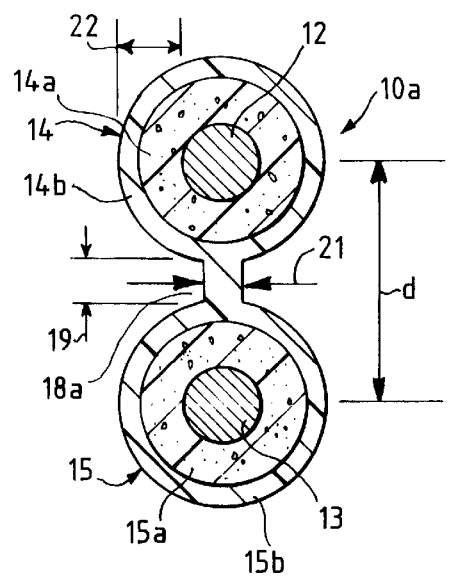
FIG. 3 is a cross-section similar to FIG. 2 of another embodiment of the present invention.

FIG. 3 illustrates another embodiment of our invention wherein the joining means is a solid integral web 18a which is formed by the second layers 14b and 15b. Since the dimensions are within the ranges set forth above, the same numbering is used.

Figure 4:
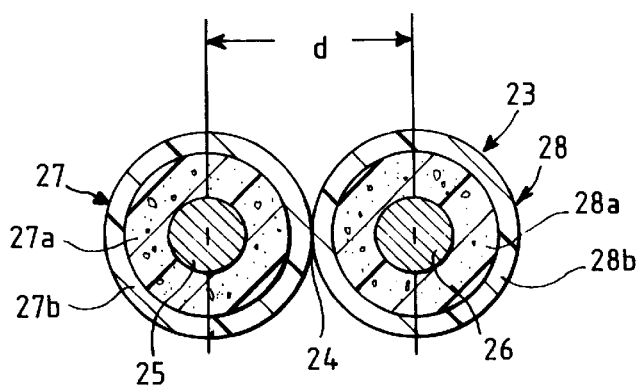
FIG. 4 is an enlarged cross-sectional view of another embodiment of a twisted pair cable of the present invention
Figure 5:
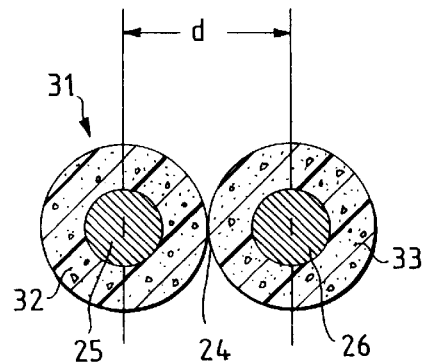
FIG. 5 is an enlarged cross-sectional view of still another embodiment of a twisted pair cable of the present invention.

FIG. 4 illustrates another embodiment of our invention. The twisted pair cable 23 is joined or bonded together substantially along their entire length at 24 by an appropriate adhesive or the adjacent second dielectric layers are bonded together by causing material contact while the dielectrics are at elevated temperatures and then cooling to provide a joined cable having no adhesive. The non-adhesive bonding provides an integral common dielectric second layer for the two conductors 25 and 26. The conductors 25 and 26 have an AWG size of from about 18 to about 40. The thickness of the combined dielectric insulation coating 27a and 27b or 28a and 28b are from about 0.00025 to about 0.150 inches. The contact between the two dielectrics 27b and 28b being such that the thickness of the contact is preferably less than the thickness of one of the dielectric layers. The dielectric layers 27a are foamed dielectrics of the same materials as dielectrics 14a and 15a. The dielectric layers 27b and 28b are the same as the dielectric layers 14b and 15b.

The bonding at 24 or webs 18 and 18a are such that the dielectric layers can be separated and remain intact with a force of not more than 5 lbs. We provide an adhesive strength between the dielectrics of between 0.1 to 5 lbs. force and preferably between 0.25 to 2.5 lbs. force.

FIG. 4 illustrates another embodiment of our invention. The twisted pair cable 31 is joined or bonded together substantially along their entire length at 24 by an appropriate adhesive or the adjacent dielectric layers are bonded together by causing material contact while the dielectrics are at elevated temperatures and then cooling to provide a joined cable having no adhesive. The non-adhesive bonding provides an integral common dielectric layer for the two conductors 25 and 26. The conductors 25 and 26 have an AWG size of from about 18 to about 40. The thickness of the combined dielectric insulation coating 32 or 33 is from about 0.00025 to about 0.150 inches. The contact between the two dielectrics being such that the thickness of the contact is preferably less than the thickness of one of the dielectric layers. The dielectric layers 32 and 33 are foamed dielectrics of the same materials as dielectrics 14a and 15a. the dielectric layers 27b and 28b are the same as the dielectric layers 14b and 15b.

The bonding at 24 or webs 18 and 18a are such that the dielectric layers can be separated and remain intact with a force of not more than 5 lbs. We provide an adhesive strength between the dielectrics of between 0.1 to 5 lbs. force and preferably between 0.25 to 2.5 lbs. force.

When being used in patch panels, punch down blocks, and connectors, it becomes necessary for the two insulated conductors to be segregated from each other. The spread can be up to one inch or more. With Twin-Lead type technology, the two conductors cannot be uniformly detached—a distinct disadvantage when compared to our invention. It should also be noted that many connectors, such as the commonly used RJ-45 jack, require that the individual insulated conductors be uniformly round. With our invention, once the singles are detached, they will retain their roundness independent of each other.

Any number of twisted pair cables may be incorporated into an overall jacketed or unjacketed cable with an optional metallic shield under the encasement, or applied over each twisted pair or groups of twisted pairs.

The cables 10, 10a, 23, and 31 provide for relatively error free transmissions within most frequencies utilized by LAN systems. The impedance of the cable is controlled by two main factors; conductor spacing and dielectric between the conductors. The more uniform the conductor spacing and dielectric, the more uniform the impedance.

An important feature of the present invention is that our twisted pair cables 10, 10a, 23, and 31 each have center-to-center distances d measured between the centers of adjacent conductors that is ±0.03 times the average of d with the variation being not any more than this at any point along a 1000 ft. twisted pair cable.

To measure the average of d in our twisted pair cables, we randomly select at least three and preferably twenty 1000 ft. samples of cable of the same size from the same run or at least three separate successive runs with each of the successive runs occurring on a separate day or 24 hour period. The average d is calculated by taking at least 20 measurements on each 1000 ft. cable with each measurement taken at least 20 ft. apart, adding all the measurements taken and dividing the added measurements by the total number of measurements taken. All of the d measurements taken fall within the tolerances of ±0.03 times the average d. If they do not, the twisted pair cables from those runs are discarded.

The following exemplifies 4 twisted pair joined 24 AWG cables that we prepared and measured and that do not have the required center-to-center distance d of the present invention. The cables have an average center-to-center conductor spacing of 0.0353 inches. This average d in inches is taken from three randomly selected 1000 ft. lengths of cable taken from three successive runs on three separate days, with 20 measurements taken in at least 20 ft. intervals on each cable. The results are shown in the following table wherein all the measurements are in inches.

| Sample | Cable 1(d) | Cable 2(d) | Cable 3(d) |
|---|---|---|---|
| 1 | .0355 | .0364 | .0344 |
| 2 | .0352 | .0368 | .0340 |
| 3 | .0358 | .0364 | .0341 |
| 4 | .0353 | .0357 | .0346 |
| 5 | .0348 | .0352 | .0344 |
| 6 | .0340 | .0356 | .0348 |
| 7 | .0347 | .0356 | .0352 |
| 8 | .0349 | .0359 | .0345 |
| 9 | .0355 | .0367 | .0341 |
| 10 | .0362 | .0362 | .0347 |
| 11 | .0367 | .0366 | .0352 |
| 12 | .0363 | .0363 | .0350 |
| 13 | .0354 | .0356 | .0356 |
| 14 | .0348 | .0347 | .0354 |
| 15 | .0345 | .0355 | .0351 |
| 16 | .0344 | .0352 | .0345 |
| 17 | .0351 | .0359 | .0344 |
| 18 | .0356 | .0363 | .0341 |
| 19 | .0351 | .0366 | .0336 |
| 20 | .0347 | .0368 | .0335 |
| TOTAL | .7045 | .7194 | .6912 |

Cable Totals
1+2+3 divided by 60 equals 0.0353 inches

In this case, the range of acceptable d is from 0.0342 to 0.0364 inches, i.e., 0.0353 (the average)±0.0011 (0.03× 0.0353). Since in the above example there are measurements outside this tolerance in each of the cables, all of the twisted pair cables from each of these runs would be rejected.

One way to measure the amount of structural variation in a cable is by sending a signal along the transmission line (cable path) and measuring the amount of energy reflected back towards the testing apparatus. Sometimes the reflected electrical energy peaks at particular frequencies (often referred to as "spikes" within the cable industry). This is the result of a cylindrical variation in the construction which matches the cyclical wave (or frequency) propagating down the cable. The more energy reflected back, the less energy is available at the other end of the cable.

The actual reflected energy can be predicted by the impedance stability of the transmission line. If a 100 ohm impedance signal is sent down the cable, any part of the cable which is not exactly 100 ohms will cause a reflection.

Therefore, an alternative and/or combined feature of our twisted pairs 10, 10a and 23 is that each twisted pair cable have an impedance of from 90 to 110 ohms when measured at high frequencies of about 10 MHz to about 200 MHz with a tolerance of no greater than ±5%. The tolerance is determined by multiplying ±0.05 times an average impedance. The average impedance is calculated by taking impedance measurements between about 10 MHz to about 200 MHz on random samplings of 1000 ft. twisted pair cables of the same size with at least one impedance measurement on each of at least twenty (20) random samples of 1000 ft. twisted pair cables taken from the same run.

Another average impedance which would be acceptable would be taking at least one impedance measurement on at least twenty randomly selected 1000 ft. twisted pair cables of the same size taken from three separate successive runs on at least three separate days. The 1000 ft. twisted pairs are rated for an impedance of about 90 to about 110 ohms when measured at a frequency of between 10 MHz and 200 MHz. As noted above, the acceptable 1000 ft. twisted pair will have an impedance at any frequency between 10 MHz and 200 MHz that varies no greater than ±0.05 times the average impedance. For example, if the average impedance is 96.2, no impedance measurement between 10 MHz and 200 MHz can be greater than 101.0 ohms (96.2+4.8[96.2×0.05]) or less than 91.4 ohms (96.2−4.8[96.2×0.05]).

Still another average impedance used in the present invention is calculated by taking at least 200 impedance measurements of one of twenty consecutive 1000 ft twisted pair conductors with the at least 200 impedance measurements being taken in less than 0.5 MHz increments. If any of the impedance measurement between 10 and 200 MHz vary by more than or less than 0.05 times the average impedance in the one cable than the cable run is not acceptable.

The average impedance is calculated in the usual manner i.e. adding all of the impedance measurements and dividing the total by the number of impedance measurements.

The pulling apart of the twisted pair cables for at least an inch, leaves the insulation 14, 15 and 27, 28 substantially intact over the separated portion and does not disturb the twist. The cables 10, 10a and 23 can each be separated without causing the twist to unravel and separate.

The adhesion strength is determined by holding one insulated conductor and pulling the other insulated conductor. The preferred adhesion strength of between 0.25 and 2.5 lbs. force for the twisted cables 10, 10a and 23 substantially leaves the insulation 14 and 15 and 27 and 28 substantially intact.

The twisted pair cables 10, 10a and 23 are prepared by extruding the insulations over two wires simultaneously and then adhering the two insulated conductors via bonding, webbing, or other suitable means. The adjoined insulated conductors are twisted to produce the desired number of twists per paired wire cable length.

The twisted wire cable 23 is preferably prepared by the side-by-side coating of two conductors, first with the foamed dielectric and after the foamed dielectric is appropriately sized, to the desired diameter, the sized foamed dielectric is coated with the second dielectric, then joining the two insulated conductors prior to winding the wires, optionally using an adhesive to bond the two coated wires, and after bonding of the two wires, twisting the joined insulated wires to the desired twist.

The foregoing description is for purposes of illustration only and is not intended to limit the scope of protection accorded this invention. The scope of protection is to be measured by the following claims, which should be interpreted as broadly as the inventive contribution permits.

The claimed invention is:

1. A twisted pair cable comprising:
   two conductors,
   a first dielectric layer surrounding each conductor,
   said first dielectric layer being a foamed dielectric,
   said conductors and corresponding dielectric layers being twisted substantially along the length of said cable to provide the twisted pair cable, said twisted pair cable has a center-to-center distance between the two twisted conductors varying over any 1000 ft length±0.03 times an average center-to-center distance with said average center-to-center distance being the average of at least 20 distance measurements taken at least 20 feet apart from three randomly selected 1000 ft twisted cables of the same size taken from the same run or taken from at least three separate successive runs with each run being on a separate day.

2. The cable of claim 1 wherein each conductor further comprises a second dielectric layer being made of the same dielectric composition with the first dielectric layer and being a non-foamed dielectric.

3. The cable of claim 2 wherein each conductor has a diameter of from about 18 to about 40 AWG and the first and second dielectric layers of each conductor have a combined thickness in the range of about 0.00025 to about 0.150 inches and the second dielectric layer of each conductor is joined together along the length of said second dielectric layers.

4. The cable of claim 3 wherein the second dielectric layers of each conductor are joined together by a webbing extending substantially along the length of each of said conductors.

5. The cable of claim 4 wherein said webbing extends from the diametrical axes of said second dielectric layers.

6. The cable of claim 4 wherein said webbing has a thickness and a width that are less than the thickness of said first and second dielectric layers.

7. The cable of claim 6 wherein each of said conductors is fixed within said first dielectric layers so that said each of said conductors is unable to rotate within said first dielectric layers.

8. The cable of claim 2 wherein said twisted pair cable has an impedance of about 90 to 110 ohms when measured at frequencies of about 10 MHz to about 200 MHz, said impedance being within an impedance tolerance of ±5% of an average impedance, said average impedance being:
   a. an average of at least one impedance measurement on each of at least twenty 1,000 ft. twisted pair conductors of the same size taken from the same run, or
   b. an average of at least one impedance measurement from each of twenty randomly selected 1000 ft. twisted pair conductors of the same size, taken from three separate successive runs with each run being at least 24 hours apart from each other, or
   c. selecting one twisted pair conductor from twenty consecutive 1000 ft. twisted pair conductors and taking at least 200 impedance measurements on said one twisted pair conductor with said at least 200 impedance measurements being at between 10 MHz and 200 MHz taken in less than 0.5 MHz increments.

9. The cable of claim 8 wherein said second dielectric layer of each conductor is joined together along the length of said second dielectric layers.

10. The cable of claim 2 wherein said second dielectric layer of each conductor is joined together along the length of said second dielectric layers.

11. A twisted pair cable comprising:
    two conductors,
    a first and second dielectric layer surrounding each conductor, said first dielectric layer being a foamed dielectric, said second dielectric layer surrounding said first dielectric layer,
    said conductors and corresponding dielectric layers being twisted substantially along the length of said cable to provide the twisted pair cable, said twisted pair cable has over any 1000 ft., an impedance of about 90 to 110 ohms when measured at frequencies of about 10 MHz to about 200 MHz, said impedance being within an impedance tolerance of ±5% of an average impedance, said average impedance being:
    a. an average of at least one impedance measurement on each of at least twenty 1,000 ft. twisted pair conductors of the same size taken from the same run, or
    b. an average of at least one impedance measurement from each of twenty randomly selected 1000 ft. twisted pair conductors of the same size, taken from three separate successive runs with each run being at least 24 hours apart from each other, or
    c. selecting one twisted pair conductor from twenty consecutive 1000 ft. twisted pair conductors and taking at least 200 impedance measurements on said one twisted pair conductor with said at least 200 impedance measurements being at between 10 MHz and 200 MHz taken in less than 0.5 MHz increments.

12. The cable of claim 11 wherein each conductor has a diameter of from about 18 to about 40 AWG and the first and second dielectric layers of each conductor has a combined thickness in the range of about 0.00025 to about 0.150 inches.

13. The cable of claim 12 wherein the dielectric layers of each conductor are joined together by a webbing extending substantially along the length of each of said dielectric layers.

14. The cable of claim 13 wherein said webbing extends from the diametrical axes of said dielectric layers.

15. The cable of claim 14 wherein said webbing has a thickness and width that are less than the diameter of said conductors.

16. The cable of claim 15 wherein said each of said conductors are fixed within said first dielectric layers so that said each of said conductors is unable to rotate within said first dielectric layers.

17. A twisted pair cable comprising:
    two conductors,
    a first and second dielectric layer surrounding each conductor, said first dielectric layer being a foamed dielectric, said second dielectric layer surrounding said first dielectric layer,
    said conductors and corresponding dielectric layers being twisted substantially along the length of said cable to provide the twisted pair cable, said twisted pair cable has over any 1000 ft., an impedance of about 90 to 110 ohms when measured at frequencies of about 10 MHz to about 200 MHz, said impedance being within an impedance tolerance of ±5% of an average, said impedance average is obtained by selecting one twisted pair conductor from twenty consecutive 1000 ft. twisted pair conductors and taking at least 200 impedance measurements on said one twisted pair conductor with said at least 200 impedance measurements being at between 10 MHz and 200 MHz taken in less than 0.5 MHz increments.

18. The cable of claim 17 wherein said twisted pair cable has a center-to-center distance at any point along the twisted pair cable that does not vary by more than ±0.03 of an average center-to-center distance, said average center-to-center distance being an average of at least 20 center-to-center distance measurements on each of at least three randomly selected 1,000 ft. twisted pair cables of the same size, each measurement being taken at least 20 feet apart and taken from the same run or from three separate runs on three successive days.

19. The cable of claim 9 wherein said first and second dielectric layers are made of the same dielectric composition with the first dielectric layer being a foamed dielectric and the second dielectric layer being a non-foamed dielectric.

20. The cable of claim 9 wherein said second dielectric layer of each conductor is joined together along the length of said second dielectric layers.

* * * * *

UNITED STATES PATENT AND TRADEMARK OFFICE
CERTIFICATE OF CORRECTION

PATENT NO.    : 6,222,129 B1
DATED         : April 24, 2001
INVENTOR(S)   : Siekierka et al.

It is certified that error appears in the above-identified patent and that said Letters Patent is hereby corrected as shown below:

<u>Column 8,</u>
Lines 1 and 35, insert -- an average obtained by -- before the word "selecting".

<u>Column 10,</u>
Lines 7 and 11, cancel "9" and insert -- 17 --.

Signed and Sealed this

Twenty-eighth Day of May, 2002

Attest:

JAMES E. ROGAN
Attesting Officer    Director of the United States Patent and Trademark Office